United States Patent
Taylor

(10) Patent No.: US 10,888,928 B2
(45) Date of Patent: Jan. 12, 2021

(54) METHOD OF PRODUCING COMPOSITE COMPONENTS USING SINTER FIT

(71) Applicant: GKN Sinter Metals, LLC, Auburn Hills, MI (US)

(72) Inventor: Alan C. Taylor, Lake Orion, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 206 days.

(21) Appl. No.: 15/543,874

(22) PCT Filed: Jan. 12, 2016

(86) PCT No.: PCT/US2016/013002
§ 371 (c)(1),
(2) Date: Jul. 14, 2017

(87) PCT Pub. No.: WO2016/115104
PCT Pub. Date: Jul. 21, 2016

(65) Prior Publication Data
US 2018/0264554 A1    Sep. 20, 2018

Related U.S. Application Data

(60) Provisional application No. 62/104,410, filed on Jan. 16, 2015.

(51) Int. Cl.
*B22F 7/06* (2006.01)
*B22F 7/08* (2006.01)
(Continued)

(52) U.S. Cl.
CPC ............ *B22F 7/062* (2013.01); *B22F 3/1035* (2013.01); *B22F 7/08* (2013.01); *F16C 33/145* (2013.01);
(Continued)

(58) Field of Classification Search
None
See application file for complete search history.

(56) References Cited

U.S. PATENT DOCUMENTS 2,652,520 A * 9/1953 Studders ................. B22F 7/062
                                                     428/548
3,652,235 A    3/1972 Manilla et al.
(Continued)

FOREIGN PATENT DOCUMENTS

EP    0 638 382 A1    2/1995
EP    1 708 248 A1    10/2006
(Continued)

OTHER PUBLICATIONS

Cverna, Fran Conti, Patricia. (2006). Worldwide Guide to Equivalent Irons and Steels (5th Edition). (pp. Compositions of Alloy Steel) . ASM International. Retrieved from https://app.knovel.com/hotlink/toc/id:kpWGEISE04/worldwide-guide-equivalent/worldwide-guide-equivalent (Year: 2006).*

(Continued)

*Primary Examiner* — Sheng H Davis
*Assistant Examiner* — Christopher D. Moody
(74) *Attorney, Agent, or Firm* — Quarles & Brady LLP

(57) ABSTRACT

A method of sinter fitting a powder metal compact around a core forms a composite component. By exploiting the shrinkage associated with the sintering of a powder metal compact, a sintered powder metal section may be dimensionally shrunk onto a core to create a mechanical interference fit between a core section and a sintered powder metal section. This method may be used to join materials such as aluminum and steel together, which traditionally have been difficult to join to one another.

19 Claims, 6 Drawing Sheets

(51) Int. Cl.
*B22F 3/10* (2006.01)
*F16C 33/14* (2006.01)

(52) U.S. Cl.
CPC ....... *B22F 2998/10* (2013.01); *F16C 2204/20* (2013.01)

(56) References Cited

U.S. PATENT DOCUMENTS

| | | | | |
|---|---|---|---|---|
| 3,753,704 | A * | 8/1973 | Manilla | B21C 23/22 419/8 |
| 3,962,772 | A | 6/1976 | Haller | |
| 3,992,202 | A * | 11/1976 | Dulis | B22F 3/15 419/5 |
| 4,090,873 | A * | 5/1978 | Takamura | B22F 7/08 419/42 |
| 4,595,556 | A * | 6/1986 | Umeha | B22F 7/002 419/46 |
| 4,616,389 | A * | 10/1986 | Slee | B23P 11/025 29/447 |
| 4,729,789 | A * | 3/1988 | Ide | B22F 7/08 75/244 |
| 4,885,212 | A * | 12/1989 | Prewo | C22C 47/14 428/552 |
| 4,969,262 | A * | 11/1990 | Hiraoka | B22F 7/062 29/38 E |
| 4,985,979 | A * | 1/1991 | Speakman | B21J 15/02 29/512 |
| 5,741,099 | A * | 4/1998 | Aasgaard | B21J 15/048 29/525.06 |
| 6,080,339 | A * | 6/2000 | Fleming | C03B 19/12 264/1.21 |
| 8,343,686 | B2 | 1/2013 | DeJonghe et al. | |
| 2008/0131719 | A1* | 6/2008 | Okaniwa | B22F 3/105 428/564 |
| 2009/0035169 | A1 | 2/2009 | Vaughn et al. | |

FOREIGN PATENT DOCUMENTS

FR  2 662 962 A1  12/1991
JP  S60-155605 A  8/1985

OTHER PUBLICATIONS

International Searching Authority, PCT International Search Report and Written Opinion for corresponding International Application No. PCT/US2016/013002, dated Jun. 1, 2016, 12 pages.

* cited by examiner

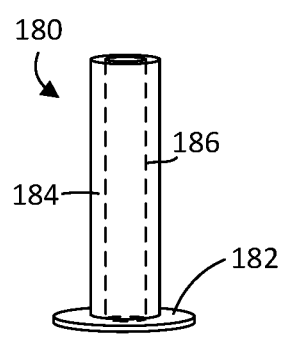
FIG. 8A
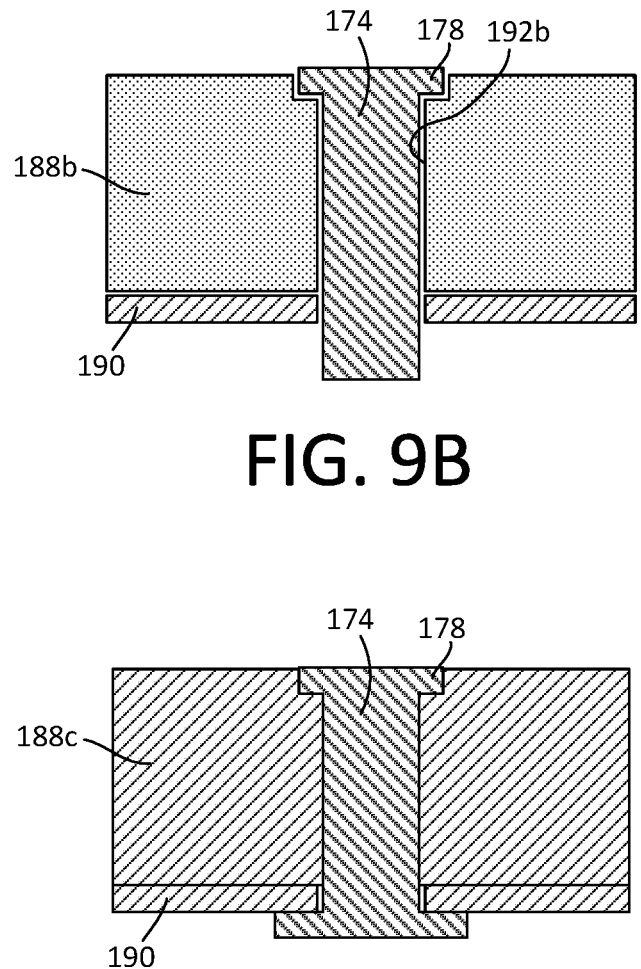
FIG. 9A
FIG. 9B
FIG. 9C
FIG. 8B

METHOD OF PRODUCING COMPOSITE COMPONENTS USING SINTER FIT

CROSS-REFERENCE TO RELATED APPLICATION

This application represents the national stage entry of PCT International Application No. PCT/US2016/013002 filed Jan. 12, 2016, and claims the benefit of the filing date of U.S. Provisional Patent Application No. 62/104,410 entitled "Method of Producing Composite Components Using Sinter Fit" filed on Jan. 16, 2015, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to powder metallurgy. In particular, this disclosure relates to methods of joining separate parts made from different materials to form a composite component in which at least one of the component parts is made from powder metal by sintering.

BACKGROUND

In powder metallurgy, a loose powder metal material is typically compacted into a preform in a tool and die set and then sintered by heating the compacted preform to a temperature just below the melting temperature of the majority of constituents in the compacted powder metal preform. During sintering, adjacent powder metal particles typically remain solid and diffuse into one another. This solid state diffusion causes the particles to neck into one another and to fuse firmly together. The resultant sintered product is usually less than fully dense and has some residual internal porosity.

While much sintering is solely solid state, sometimes powder compositions are also selected to produce a small amount of liquid phase at sintering temperatures. In liquid phase sintering, this liquid phase melts during sintering and is transported via capillary action through the pores before solidifying. Many aluminum-based powders employ liquid phase diffusion.

Powder metallurgy is thus generally considered to be well-adapted for high volume production parts which have complex dimensional features that can be formed through uniaxial compaction.

As noted above, due to the processes used to make them, sintered components often have porosity and are not always as mechanically robust as their cast or wrought counterparts which are fully dense. Even small amounts of porosity can result in lower materials properties. For example, internal porosity can lower the strength of a sintered powder metal material in comparison to a comparable cast product. Nonetheless, sintered parts may also offer benefits that are lacking in comparable cast or wrought products such as improved economy, low material weight, and so forth. Further, because the as compacted powder metal components are often net shape or near net shape, finishing operations may be diminished or avoided altogether.

Nonetheless, there remains an interest in improving the range of applications in which powder metal components may be employed. To the extent that inherent weaknesses of these types of components can be masked or other improvements added to improve the characteristics of these components, powder metal may be made commercially feasible in new applications and markets or more commercially desirable in applications and markets for which powder metal is already utilized.

SUMMARY OF THE INVENTION

In order to produce composite components having improved or dynamic properties, a method of forming a composite component between a powder metal component and a non-powder metal component is disclosed herein. By use of this method, a composite component can be made in such a way as to highlight the desired benefits of the powder metal component and of the non-powder metal component, while avoiding many of their respective disadvantages. Further, the same process that may be used to create a composite component may be applicable to other situations in which two dissimilar materials are to be joined or assembled together.

According to one aspect of the invention, a method of sinter fitting an aluminum powder metal compact around a steel core to form a composite component is disclosed. This method includes the sequential steps of compressing an aluminum powder metal to form an aluminum powder metal compact having an opening formed in the aluminum powder metal compact, inserting the steel core in the opening of the aluminum powder metal compact whereby an inter-component clearance is initially established in a space between the aluminum powder metal compact and the steel core, and sintering the aluminum powder metal compact with the aluminum powder metal compact in place around the steel core in order to form the composite component. Accordingly, the composite component includes a sintered aluminum powder metal section that is formed by sintering the aluminum powder metal compact and further includes a steel core section comprising the steel core (although other constituents may also be part of the composite component). Notably, the sintering step results in a dimensional shrinkage of the aluminum powder metal compact as the sintered aluminum powder metal section is formed by sintering, such that the sintered aluminum powder metal section of the composite component shrinks onto the steel core section to cause a mechanical interference fit between the sintered aluminum powder metal section and the steel core section. This dimensional shrinkage resulting in an interference fit joins the sections together.

There can be many benefits to a steel core with an aluminum-shell or aluminum-skin type construction.

For example, the steel core section of the composite component may structurally reinforce the sintered aluminum powder metal section of the composite component. These improvements may improve the strength or modulus of the aluminum powder metal component.

As another example of a potential benefit resulting from this composite construction, the steel core section of the composite component may inhibit distortion of the sintered aluminum powder metal section of the composite component during sintering. Certain powder metal parts and, particularly tall parts, can be prone to sagging or distortion during sintering. The steel may effectively act as a supporting structure to inhibit such sagging from occurring.

As another example of a potential benefit resulting from this construction, the sintered aluminum powder metal section of the composite component may provide a skin for the steel core section of the composite component that provides improved protection from corrosion of the steel core section.

There may also be instances in which the composite component is engineered such that the core and skin or shell help to provide certain functions where a single material would be unable to adequately perform at least one of the particular functions or would perform this/these function(s) in a sub-par manner. For example, in many instances it may be desirable for a component to be ferromagnetic, but a sintered aluminum powder metal part lacks magnetism. By way of the method described above, a magnetic core may be inserted into an otherwise non-magnetic powder metal component to provide the composite part with magnetic properties. As another example, the sintered aluminum powder metal section may provide a bearing surface on a steel component in situations where direct bearing on the steel would otherwise be unadvisable (due to, for example, joining of the components that bear on one another due to heat creation resulting from friction). Still yet, the electrical or thermal properties of the different sections can be altered via virtue of the composite construction.

Throughout this application, the term "aluminum powder metal" is used to refer to not only pure aluminum powder metal, but any aluminum or aluminum alloy powder metal. Thus, other alloying elements may be present in addition to aluminum and these alloying elements might be presented as separate elemental additions (for example, in separate powders), as part of a master alloy powder, or might be pre-alloyed with the aluminum powder. Further still, "aluminum powder metal" is contemplated as covering both purely metallic powders as well as metal matrix composite (MMC) materials. Thus, in some forms, the aluminum powder metal compact and sintered aluminum powder metal section may be a metal matrix composite further including a ceramic reinforcement phase.

For the sake of clarity, the method disclosed herein is not directed at the formation of a duplex or composite parts made merely from two different types of powder metal components in which the powders are simultaneously sintered. Rather, it is contemplated that the steel core may be wrought, cast, or previously sintered powder metal steel and substantially fully dense when the steel core is inserted into the opening of the aluminum powder metal compact such that, during the sintering of the aluminum powder metal compact, there is substantially no dimensional change of the steel core due to densification. Thus, it is contemplated that at least one of the parts of the composite component (that is, the core) is not susceptible to appreciable shrinkage during the sintering operation.

The insertion of the core into the opening of the powder metal compact may be partial or may be full. For example, in one form, the opening in the aluminum powder metal compact may extend from one face of the aluminum powder metal compact to another face of the aluminum powder metal compact and the step of inserting the steel core may involve inserting the steel core such that the steel core extends substantially through the opening. It is also contemplated, however, that the core might be partially inserted in an opening extending from one side of the compact to another side or that the opening formed in the powder metal compact might be a blind hole (that is, not extending entirely through the compact) and the core might be inserted into this blind hole.

The inter-component clearance established between the aluminum powder metal compact and the steel core may be said to be between facing surfaces of the aluminum powder metal compact and the steel core. A measured dimension, defined by points on the facing surface of the aluminum powder metal compact, may dimensionally shrink between 1 and 5 percent during sintering. Accordingly, the facing surfaces may be sized and shaped to achieve an interference fit therebetween during shrinkage upon sintering. It is contemplated that these facing surfaces may be configured in a number of ways. The facing surfaces may have profiles that generally correspond to one another, such that, upon sintering and shrinking of the powder metal compact, the facing surfaces are brought into contact with one another. In some forms, this contact may occur over nearly the entire amount of their surface areas. However, the profiles of the facing surfaces may not necessarily match one another and so it is contemplated that only fractional contact of the facing surfaces may occur while still achieving an interference fit between the core and skin/shell during sintering. For example, at least one of the facing surfaces may include a surface feature selected from the group consisting of threads, splines, a key, and D-shaped flattened faces. The other of the facing surfaces may have a corresponding profile or may have comparably flat or round surfaces that come into contact with these features upon sintering.

In order to better locate the components relative to one another and to facilitate mechanical joining of components, the steel core may have a flange on one end such that the steel core resembles a rivet. The flange on the steel core may mate with a generally correspondingly shaped recess on the aluminum powder metal compact to locate the two relative to one another. It is contemplated that the flange may be received in a correspondingly shaped counter-bored opening in the powder metal compact (and that the flange may be sinter fit into place as well as the remainder of the body of the core) or may be axially abutted against a flat surface of the powder metal compact. In some instances, the method may further comprise the step of locating another component (for example, a second plate) on an available end of the rivet and riveting the available end of the rivet (that is, the non-flanged end) in order to join the composite component to the other component.

The core and powder metal compact may have a number of shapes or geometries. It is contemplated that, in some forms, the steel core may have an axially extending opening, thereby reducing the weight of the steel core by elimination of material mass. It is further contemplated that, in other forms, the steel core may be a ring and the aluminum powder metal compact may be a ring and the rings may be co-axially located with one another prior to sintering. Such an arrangement can be used to create a steel-backed aluminum ring or may be useful in bushing or bearing applications.

According to another aspect of the invention, a composite component is disclosed as may be made by any of the methods described above or herein.

Returning to the method in a more general sense, the powder metal compact may not be aluminum and/or the core may not be steel. According to another aspect of the invention, a method of sinter fitting a powder metal compact around a non-powder metal core to form a composite component is more generally disclosed. This method comprises the sequential steps of compressing a powder metal to form a powder metal compact having an opening formed in the powder metal compact, inserting the non-powder metal core in the opening of the powder metal compact whereby an inter-component clearance is initially established in a space between the powder metal compact and the non-powder metal core, and sintering the powder metal compact with the powder metal compact in place around the core to form the composite component. In this general instance, the composite component includes a sintered powder metal section that is formed by sintering the powder metal compact and further including a core section comprising the non-powder metal core. As noted in the more specific case above, the sintering step results in a dimensional shrinkage of the powder metal compact as the sintered powder metal section is formed by sintering such that the sintered powder metal section of the composite component shrinks onto the core section to cause a mechanical interference fit between the sintered powder metal section and the core section to join the sections together.

It should be noted that although this general method might be practiced, that there are certainly advantages to the specific aluminum-steel construction that is specifically described herein, as it historically has been problematic to join aluminum and steel to one another.

Further still it will be appreciated that nothing described herein so limits the concept to a two section composite material. It is contemplated that variations in structural arrangement may be made (for example, multiple cores inserted into a single powder metal compact or, as another example, multiple powder metal sections received on a core) that provide immense expandability of the concept. Further still, it is observed that one or more of the composite components may be designed to be subsequently attached to still other components by virtue of features that are designed into the core and or compact that is to be sintered.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 8A and 8B illustrate a rivet with a flange on one end thereof in which the rivet has either a solid body or has an axially-extending opening formed through the body, respectively.

FIGS. 9A through 9C illustrate various usage configurations of a rivet that is used to join multiple parts together including at least one part which is made from a powder metal.

DETAILED DESCRIPTION OF THE PREFERRED EMBODIMENTS

Figure 1:
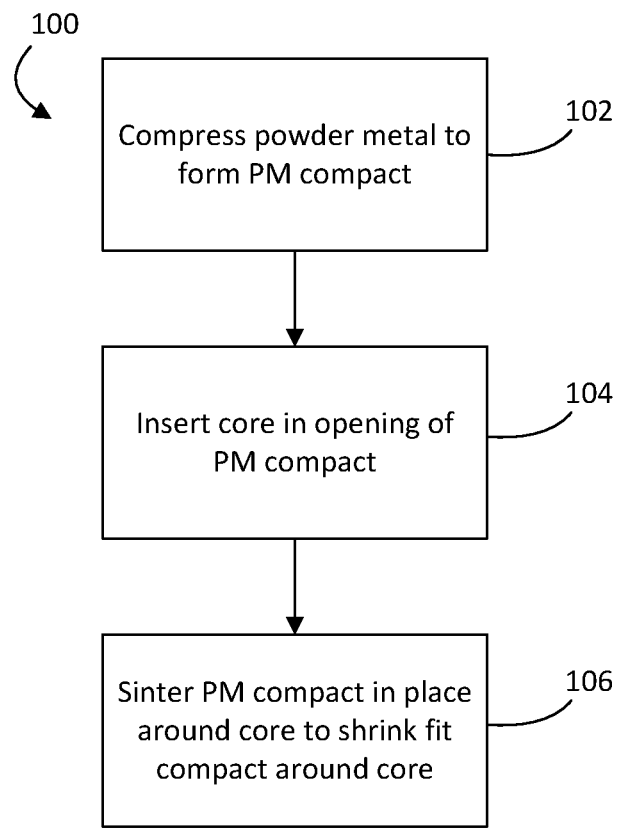
FIG. 1 is a flowchart illustrating the sequential steps of a method of making a composite component according to one aspect of the present invention.

Referring first to FIGS. 1, 2A through 2C, and 3A through 3C, a method 100 of making a composite component 108 is illustrated. Because the order of the method steps is significant to the manner in which the composite component 108 is constructed, the described steps should be performed sequentially.

First, according to step 102, a powder metal is compacted to form a powder metal (PM) compact 110a. As is known to those having ordinary skill in the art, a powder metal compact 110a can be formed by compressing loose powder metal with some amount of lubricant and/or binder to a tool and die set. Typically, this compaction is done in a uniaxial press in which powder metal is fed into a die cavity having a lower tool or tools received therein and then lowering the upper tool or tools and applying a sufficiently high pressure to form a semi-stable powder metal compact. By use of a core rod or other tooling arrangements, an opening 112 (or multiple openings) can be formed in an axial direction of the powder metal compact 110a. Once the powder is compacted, then the compacted powder metal component or "preform" is ejected from the press by virtue of tool movement.

According to many forms of this invention, the powder metal may be an aluminum powder metal in which the powder metal is purely aluminum or may be an aluminum alloy powder in which one or more alloying elements are added to the powder metal, either as a separate elemental powder or powders, as part of a master alloy, or as pre-alloyed constituents in an aluminum powder (or combinations thereof). It is also contemplated that the powder metal may include ceramic inclusions, such as would be the case in a metal matrix composite material (MMC). If the powder metal compact 110a is an MMC, up to 20 volume percent of the powder metal compact may be ceramic (for example, a SiC ceramic addition). Other powder metal compositions might also be used other than aluminum; although for reasons that will become more apparent below, the powder metal compact 110a should be sinterable at a temperature that is less than a temperature that could structurally compromise the material of the core 114a.

It should be appreciated that aluminum powder metal is a viable manufacturing process for the substitution of die cast aluminum materials or cast aluminum or forged aluminum articles. Aluminum has a lighter weight than steel and, inherently, a lower density than steel. Aluminum typically has a density of approximately 2.7 g/cm$^3$ whereas steel has a density of 7.87 g/cm$^3$. However, aluminum also has a lower strength than steel. Typically (although it depends on particular alloying compositions), aluminum has a strength that is less than 50 percent of steel. The modulus of aluminum is also lower than that of steel.

It should also be appreciated that powder metal processes allow the formation of net shape or near net shape of articles, and facilitates the manufacture of parts with potential joining features such as holes for dowels, screws, bolts, clips, bushings, rivets, tennons, dovetails, and so forth. Traditional powder metallurgy exploits these features to allow joining with other parts to increase the function and/or strength of an article. This invention, as will be appreciated from the description that follows, offers the ability to utilize the advantages of powder metal features with novel joining and/or strengthening techniques through formation of a composite component.

Returning now to the method 100, with the compact 110a made and then according to step 104, a core 114a is inserted into the opening 112 of the powder metal compact 110a. This insertion is depicted across FIGS. 2A, 2B, 3A, and 3B, in which the core 114a is illustrated first being outside of the powder metal compact 110a (as in FIGS. 2A and 3A) and is then illustrated as being received entirely through the opening 112 of the core 110a (as in FIGS. 2B and 3B).

In the form illustrated, the core 114a is steel although it is contemplated that the core 114a might be formed of other materials. Typically, this core 114a will be formed of a non-powder metal material and may be, for example, a cast and/or worked (for example, drawn, rolled, and so forth) part. The core 114a is to be nearly fully dense such that, during the subsequent sintering step 106, the core 114a is not prone to dimensional change at the sintering temperatures for the powder metal compact 110a.

It is important to note that during the step of insertion 104, there is an inter-component clearance 118 present between the facing surfaces 120 and 122 of the powder metal compact 110a and the core 114a, respectively. This inter-component clearance 118 is small, but means that the step 104 of insertion does not involve forming an immediate interference fit between the compact 110a and the core 114a during insertion. Rather, the un-sintered powder metal compact 110a and the core 114a are potentially movable with respect to one another during insertion, such the powder metal compact 110a can be positioned relative to the core 114a.

Figure 2A:
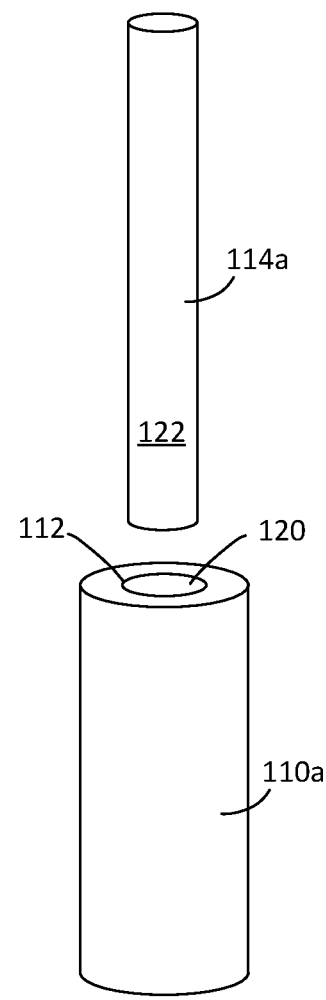
FIGS. 2A through 2C illustrate exemplary steps in which a core is inserted into a powder metal compact and sinter fit in accordance with the method of FIG. 1 to produce a composite component.
Figure 2B:
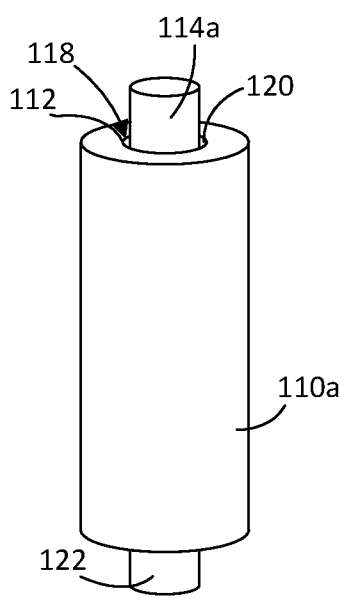
Figure 2C:
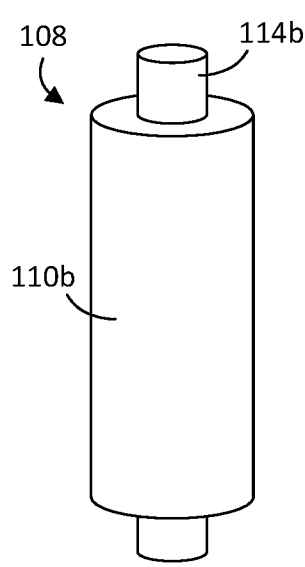
Figure 3A:
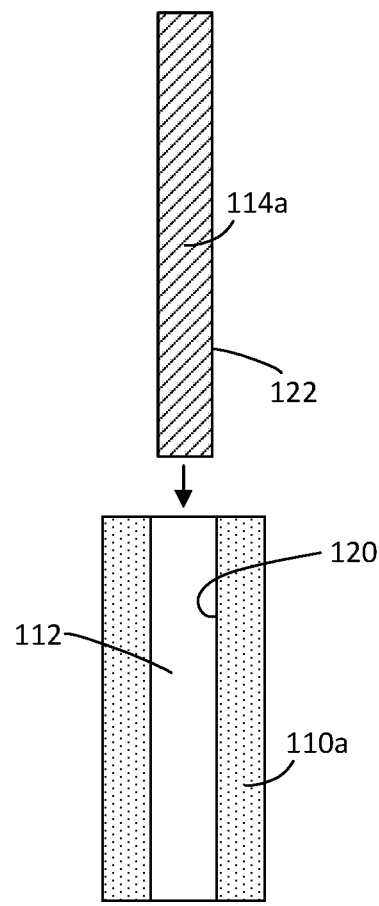
FIGS. 3A through 3C provide side cross-sectional views of the exemplary steps of illustrated FIGS. 2A through 2C, respectively, taken through the central axis of the various components.
Figure 3B:
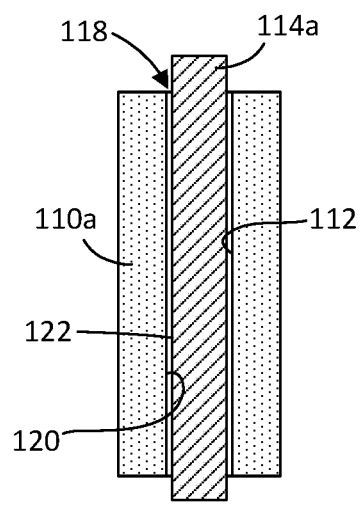
Figure 3C:
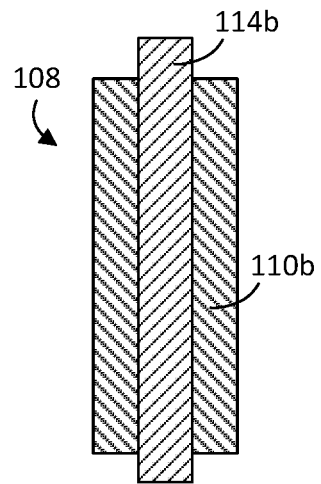

Once the powder metal compact 110a has been inserted onto the core 114a, then the powder metal compact 110a is sintered around the core 114a in step 106 as illustrated in FIGS. 2C and 3C. This sintering may be done, for example, by placing the compact 110a and the core 114a into a sintering furnace at a sintering temperature for a time duration that will cause the powder metal compact 110a to sinter. Notably, the materials for the powder metal compact 110a and the core 114a and the sintering conditions are selected such that the compact 110a sinters and shrinks (typically in the range of 1 to 3 percent in a linear dimensionally, depending on the particular material composition, compacted densities, and sintering conditions) and such that the core 114a remains dimensionally stable (that is, does not significantly bend, warp, or shrink during sintering).

In this way, the compact 110a can be "sinter fitted" onto the core 114a. During this sinter fitting, the dimensions of the compact 110a shrink while the dimensions of the core 114a remain stable. As this shrinkage of the compact 110a occurs, the facing surface 120 of the powder metal compact 110a is brought toward the facing surface 122 of the core 114a. Because the inter-component clearance 118 is engineered or selected to be small, as the sintering proceeds, the facing surfaces 120 and 122 are brought into mechanical interference with one another such that the compact 110a is shrunk onto the core 114a so that the two components are mechanically joined together. It should be observed that little or no diffusion bonding between the compact 110a and the core 114a is contemplated during sinter fitting of this type and the primary mechanism for joining is the dimensional change of the compact 110a relative to the core 114a. Indeed, for certain materials, diffusion bonding may be undesirable and so one or both of the facing surface might potential be treated or coated to prevent diffusion bonding across the compact and core from occurring.

It will be appreciated the shape and form of the facing surfaces 120 and 122 should be engineered in such a manner as to permit free insertion during step 104, but to cause mechanical interference after sintering in step 106 preventing movement of the components relative to one another. Further, it should be appreciated that the dimensions of the facing surfaces should be selected in such a manner that the sintering step 106 does not cause the compact 110a to be over-stressed as the compact 110a shrinks around the core 114a. That is to say, if the compact 110a is expect to shrink 4 percent (a relatively shrinkage value), then it may be best to provide adequate inter-component clearance 118, as an extremely small amount of initial clearance may place significant internal stress on the compact 110a as it sinters and potentially damage the component(s) during sintering.

In any event, after the sintering step 106 is completed, then a composite component 108 has been formed as is illustrated in FIGS. 2C and 3C. This composite component includes a sintered powder metal portion 110b (which is the sintered version of the powder metal compact 110a) and a core portion 114b (which corresponds to the core 114a).

Although a cylindrically-shaped core 114a and tubular-shaped powder metal compact 110a are illustrated in FIGS. 2A through 2C and 3A through 3C such that the facing surfaces 120 and 122 are made to contact one another substantially over their entire area after sintering, it is observed that nothing so limits the components to these geometries. Indeed, a sinter fit may be obtained in parts having non-cylindrically shaped facing surfaces or having additional features supported thereon.

Some examples of these alternative geometries are illustrated in FIGS. 4A through 4F, which provide cross-sectional views taken through cores such that the core is viewed down its central axis. Although the features are illustrated on the core in these figures, one having ordinary skill in the art will appreciate that these features may have matching profiles on the powder metal compact. These matching profiles may interlock with some or all of the features. Alternatively, in some instances, these features might be made to mechanically interfere with an oppositely facing surface (that is to say, for example, a cylindrical surface of the compact might be shrunk onto, for example, a threaded core). Still yet, the illustrated features on the facing surface of the core might instead be transferred to the facing surface of the powder metal compact and the core may be comparably featureless.

Figure 4A:
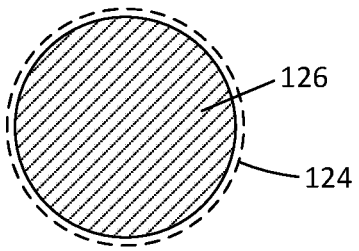
FIGS. 4A through 4F show some exemplary alternative cross-sectional views of cores taken on a plane perpendicular to the central axis of the respective cores.
Figure 4B:
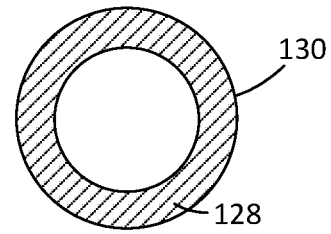
Figure 4C:
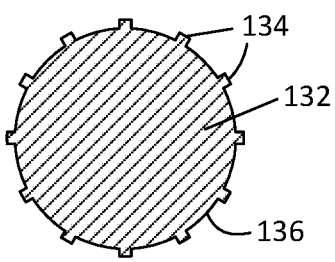
Figure 4D:
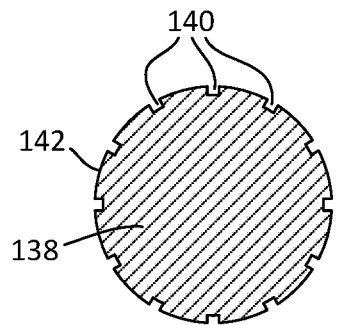
Figure 4E:
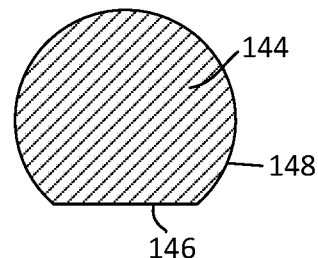
Figure 4F:
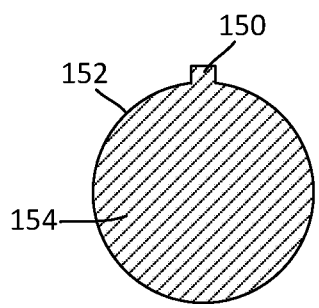

Six alternative profiles are illustrated in FIGS. 4A through 4F. In FIG. 4A, a threaded outer surface 124 is illustrated on a core 126. In FIG. 4B, the core 128 has a cylindrical radially outward facing surface 130, but the core 128 itself is hollow, making it tubular. Such modification can be made to reduce the weight of the core 128. In FIG. 4C, the core 132 has a plurality of axially-extending splines 134 extending away from its radially outward facing surface 136 while, in FIG. 4D, a core 138 has a plurality of axially-extending negative splines 140 extending into its radially outward facing surface 142. In FIG. 4E, the core 144 has a flat surface 146 formed into the otherwise cylindrical facing surface 148 that creates a D-shape for further inhibiting rotational movement on a matching compact (although it is noted that the mechanical sinter fit should prevent such relative rotation under non-extreme loading circumstances which might induce significant rotational shear stresses). In FIG. 4F, a key 150 is formed onto a radially outward facing surface 152 of a core 154 and this key 150 may be received in a corresponding slot in the compact.

According to the method described above and herein, a composite material can be created from a sintered powder metal material and a non-powder metal component that offers many benefits over a purely powder metal component.

Two such benefits are an improved combined modulus of the composite over a purely powder metal part and a strengthening of the composite over a purely powder metal part, particularly in the instance in which the core is made of steel and the compact is made of aluminum. Effectively, when the core is steel and the PM compact is aluminum, a powder metal article can be made using standard powder metal processes, but can be further made to have a supporting steel core (by virtue of the sinter fit interlocking) to produce a reinforced composite material. The reinforced powder metal compact can have a modulus or strength that exceeds that of the powder metal part alone.

Figure 5A:
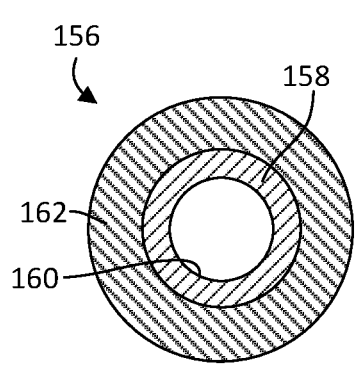
FIGS. 5A and 5B provide two cross sections through a composite component made according to the inventive method in which the core is hollow.
Figure 5B:
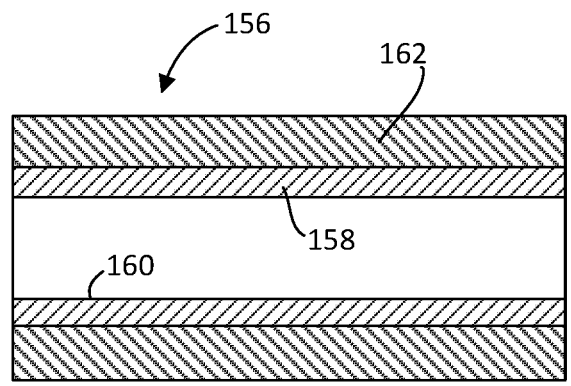

Because there can be a tradeoff between the composite properties and weight of the composite component, it is further contemplated that the reinforcing phase (that is, the core) does not need to be solid. For example, with reference to FIGS. 5A and 5B, it can be seen that a composite component 156 might be made having a tubular steel core portion 158 having a central channel 160 running through it and further having an sintered aluminum powder metal portion 162 sinter fit around the core 158. The absence of material in the channel 160 reduces the weight of the core 158 in comparison to a solid core and, depending on the particular usage situation, may not significant compromise the benefits of having the steel core in the first instance.

Figure 6:
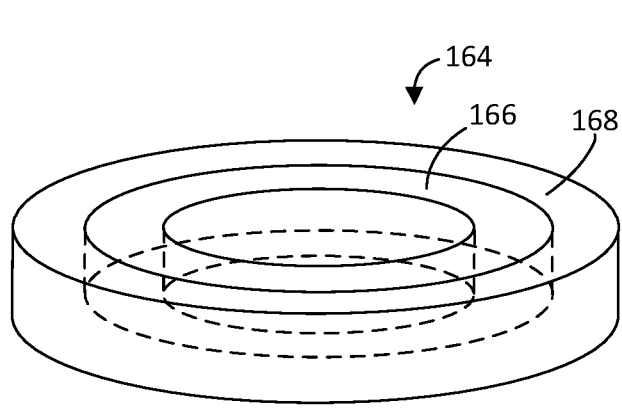
FIG. 6 illustrates one embodiment of a composite component made according to the method in which both the core and the powder metal sections are rings.

Another potential variant is illustrated in FIG. 6 in which a composite component 164 in the form of a ring is made having a steel core portion 166 in the form of a ring and a sintered aluminum powder metal portion 168. Effectively, this configuration and geometry may provide a steel-backed aluminum ring. This arrangement may be beneficial in certain bushing or bearing applications.

Figure 7:
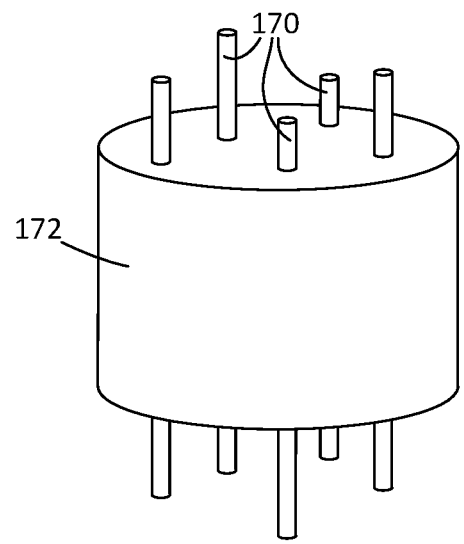
FIG. 7 shows another embodiment in which a plurality of slender cores (for example, wires) are received in a powder metal compact.

Turning now to FIG. 7, it is contemplated that wires or other slender elements 170 may constitute the core or cores and be inserted into corresponding openings in a powder metal section 172 that is sintered around the wires or other slender elements 172. Such a construction may offer desirable electrical or thermal properties. For example, the slender elements 170 may be wires and may be a copper material having particularly good thermal conductivity. This may improve heat transfer into or out of the core in which they are embedded after sinter fitting.

Still yet, one of the potential benefits of a composite part made according to the method may be that the core is made of a magnetic material (such as steel, iron, or a hard magnet) while the surrounding powder metal compact is not magnetic (such as an aluminum or aluminum alloy based powder metal part). In this way, a non-magnetic powder metal part may have an internally-supported magnetic constituent that gives the combined composite part magnetic properties that would be lacking in a component fabricated solely from non-magnetic powder metal.

As another example, it is contemplated that this composite component may be advantageously used in bushing or bearing constructions. Aluminum material is often used in bushings or bearings due to its being a dissimilar material to steel. This reduces heat generation and the probability of a friction weld forming. This disclosed composite component, particularly when MMC material is utilized, may be particularly well-suited for high wear resistance applications.

Additionally, it is contemplated that a composite material of the type described above may be utilized to reduce distortion of the powder metal portion during sintering. As noted above, aluminum powder metal materials tend to have high degrees of shrinkage during sintering and, further, can slump under their own mass during sintering as they are heated to temperatures approaching their melting point. A steel core might be added in order to inhibit slumping or distortion during sintering such that the core effectively provides a dimensionally stable support for the aluminum powder metal material as it is sintered.

Yet another potential benefit is that an aluminum powder metal skin or shell on a composite part can be made to cover the steel core such that the core is more resistant to rusting or corrosion than if the steel was left exposed. Effectively, the aluminum might serve as a cladding and it may be possible to cap any exposed ends of the core using separate aluminum powder metal components or by utilizing a blind hole.

Finally, one major benefit of the disclosed method is that it can be employed in more complex joining processes.

For example, and with reference to FIGS. 8A and 8B, the core material may be formed as a steel rivet. As in FIG. 8A, the steel rivet 174 may include a generally cylindrical body 176 having a radially-extending flange 178 formed at one end thereof. In an alternative form illustrated in FIG. 8B, to reduce weight, a steel rivet 180 may again be formed having a flange 182 on one end of a cylindrical body 184, but may also have an axially extending opening 186 passing through the center of the body 184 to eliminate material mass.

This steel rivet may be used to join one or more components in which at least one of the components is composed of a powder metal material.

Turning now to two examples in FIGS. 9A and 9B, the rivet 174 is shown extending through openings in a powder metal compact 188a or 188b and a separate non-powder metal plate 190. In the instance of powder metal compact 188a in FIG. 9A, the powder metal compact 188a has a simple through hole 192a while, in FIG. 9B, the powder metal compact 188b has a counter-bored opening 192b that receives the flanged end 178 of the rivet 174.

With the rivet 174 in place and extending through the components to be joined (i.e., the powder metal compact 188a or 188b and the plate 190), the powder metal compact 188a or 188b is sintered and sinter fit around the rivet 174. In the instance of the powder metal compact 188b of FIG. 9B (with the counter-bored opening 190b), the corresponding sintered powder metal portion 188c is illustrated in FIG. 9C. In FIG. 9C, the opening 192b from FIG. 9B has dimensionally shrunk to capture the rivet 174 in it as well as its flange 178 in the counter-bored section of the hole. This locks the rivet 174 (or "core section") in the surrounding powder metal section 188c. At this point, the free end can be riveted to further join the plate 190 to the powder metal section 188c. It is contemplated that the plate 190 might be a fully dense non-powder metal material or may be also be a separate powder metal component that shrinks upon sintering. It is also contemplated that the plate 190 need not be present during the sintering of the powder metal compact around the rivet and, in some instances, it may even be preferred to keep the plate separate from the powder metal compact to prevent diffusion joining of the components 188a, 188b, 188c, and/or 190 to one another or to prevent variances between the variable hole-to-hole distances of the powder metal section as it is sintered and the comparably static hole-to-hole distances in the plate.

Turning now to FIGS. 10A through 10D, an alternative joining form is illustrated for reinforcing aluminum shells on a planetary gear carrier using a steel reinforcement plate.

Figure 10A:
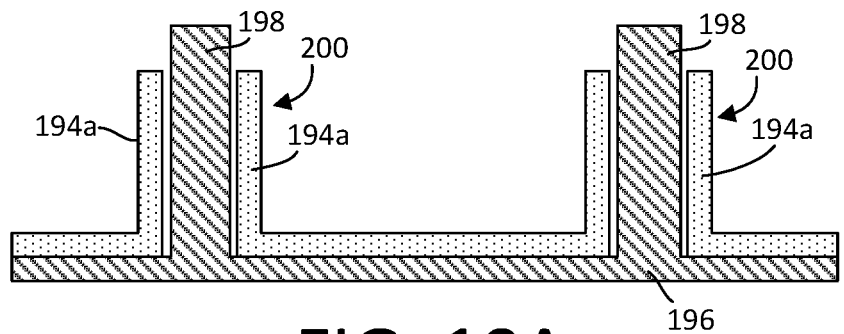
FIGS. 10A through 10C illustrate the sequential steps of placing a powder metal shroud over a support for production of a planetary gear carrier and then riveting a separate plate to the top.
Figure 10B:
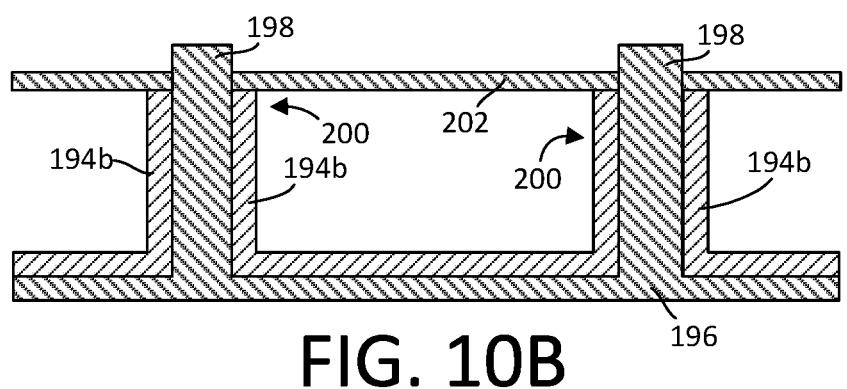
Figure 10C:
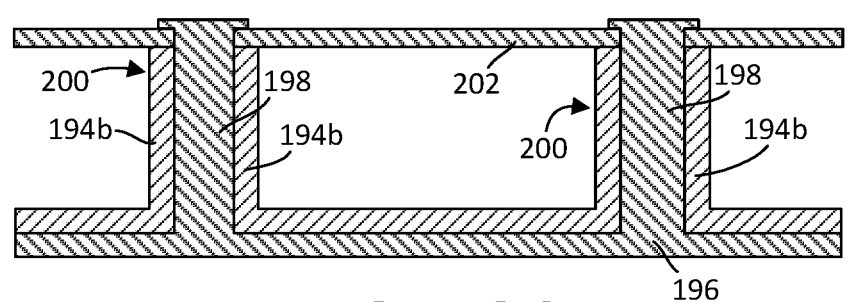

Looking first at FIG. 10A, a cross section through two support legs of a planetary gear carrier is illustrated in which an un-sintered aluminum shroud 194a is received over a steel reinforcement plate 196 having two spaced posts 198 extending upwardly therefrom. As the view illustrated is a sectional view, it will be appreciated that the aluminum shroud 194a has two tubular legs 200 that are received on the posts 198 (although the tubular nature of the legs is not readily apparent from the sectional view illustrated). This un-sintered aluminum shroud 194a is sintered to form a sintered aluminum shroud 194b, as is illustrated in FIG. 10B. Effectively, this sintering causes the legs 200 of the shroud 194a to dimensionally shrink onto the posts 198 to sinter fit the sintered shroud 194b onto the reinforcement plate 196. At this point with the sinter fit completed, a secondary plate 202 can be placed on the free, exposed end of the steel posts 198 as illustrated in FIG. 10B. This secondary plate 202 can then be attached to the composite component (comprising the reinforcement plate 196 and the sintered shroud 194b) by folding over or riveting the free end of the posts 198 to capture the secondary plate 202 on the ends on the sintered legs 200 as is illustrated in FIG. 10C.

Figure 10D:
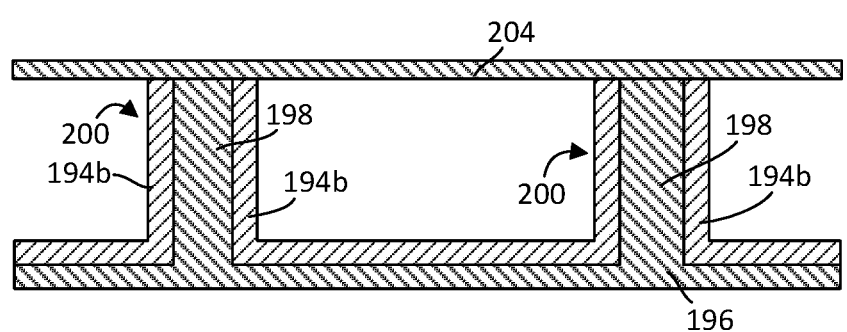
FIG. 10D illustrates an alternative arrangement for a planetary gear carrier in which, instead of riveting, the plate may be welded to the exposed top of the posts.

In a modified version of this construction, illustrated in FIG. 10D, the posts 198 may not extend beyond top of the legs 200 of the sintered aluminum shroud 194b, but may instead be generally flush therewith. The secondary plate 204 may be placed on top of the legs 200 and resistance or spot welding may be used to join the secondary plate 204 (which is steel) with the top face of the posts 198 (which are also steel).

One having skill in the art will appreciate that while the sintering of an aluminum powder metal part around a steel core has been described above that, because of the range of temperatures involved in the sintering of the aluminum, the concept would not be applicable to most, if not all, hardened steel components since the sintering temperature for the aluminum powder metal part typically exceed the tempering temperature for steel.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of sinter fitting an aluminum powder metal compact around a steel core to form a composite component, the method comprising the sequential steps of:
    compressing an aluminum powder metal to form an aluminum powder metal compact having an opening formed therein, wherein the aluminum powder metal is a pure aluminum powder metal or is an aluminum alloy powder metal;
    inserting the steel core in the opening of the aluminum powder metal compact whereby an inter-component clearance is initially established in a space between the aluminum powder metal compact and the steel core; and
    sintering the aluminum powder metal compact with the aluminum powder metal compact in place around the steel core to form the composite component, the composite component including a sintered aluminum powder metal section that is formed by sintering the aluminum powder metal compact and further including a steel core section comprising the steel core, whereby the sintering step results in a dimensional shrinkage of the aluminum powder metal compact as the sintered aluminum powder metal section is formed by sintering such that the sintered aluminum powder metal section of the composite component shrinks onto the steel core section to cause a mechanical interference fit between the sintered aluminum powder metal section and the steel core section to join the sections together;
    wherein the steel core is a rivet having a flange on one end.

2. The method of claim 1, wherein the steel core section of the composite component structurally reinforces the sintered aluminum powder metal section of the composite component.

3. The method of claim 1, wherein the steel core section of the composite component inhibits distortion of the sintered aluminum powder metal section of the composite component during sintering.

4. The method of claim 1, wherein the sintered aluminum powder metal section of the composite component provides a skin for the steel core section of the composite component that provides improved protection from corrosion of the steel core section.

5. The method of claim 1, wherein the steel core is magnetic.

6. The method of claim 1, wherein the sintered aluminum powder metal section provides a bearing surface.

7. The method of claim 1, wherein the composite component has electrical properties or thermal properties that combined differ from each of the separate sections.

8. The method of claim 1, wherein the aluminum powder metal compact and sintered aluminum powder metal section are a metal matrix composite and further includes a ceramic reinforcement phase.

9. The method of claim 1, wherein the steel core is fully dense when the steel core is inserted into the opening of the aluminum powder metal compact such that, during the sintering of the aluminum powder metal compact, there is no dimensional change of the steel core due to densification.

10. The method of claim 1, wherein the opening in the aluminum powder metal compact extends from one face of the aluminum powder metal compact to another face of the aluminum powder metal compact and the step of inserting the steel core involves inserting the steel core such that the steel core extends through the opening.

11. The method of claim 1, wherein the inter-component clearance established between the aluminum powder metal compact and the steel core is between facing surfaces of the aluminum powder metal compact and the steel core.

12. The method of claim 11, wherein at least one of the facing surfaces includes a surface feature selected from the group consisting of a key and D-shaped flattened faces.

13. The method of claim 11, wherein a measured dimension defined by points on the facing surface of the aluminum powder metal compact dimensionally shrinks between 1 and 5 percent during sintering.

14. The method of claim 1, wherein the aluminum powder metal compact includes alloying additions other than aluminum.

15. The method of claim 1, wherein the flange on the steel core mates with a generally correspondingly shaped recess on the aluminum powder metal compact.

16. The method of claim 1, further comprising the step of locating another component on an available end of the rivet and riveting the available end of the rivet in order to join the composite component to the other component.

17. The method of claim 1, wherein the steel core has an axially extending opening thereby reducing the weight of the steel core.

18. The method of claim 11, wherein at least one of the facing surfaces includes a surface feature selected from the group consisting of threads and splines.

19. The method of claim 15, wherein the aluminum powder metal compact is a plate.

* * * * *